United States Patent [19]
Markel et al.

[11] Patent Number: 6,114,457
[45] Date of Patent: Sep. 5, 2000

[54] HIGH MELT STRENGTH POLYETHYLENE COMPOSITIONS

[75] Inventors: Eric J. Markel, Kingwood; Carlos U. DeGracia, LaPorte; Armen H. Dekmezian, Kingwood, all of Tex.

[73] Assignee: Exxon Chemical Patents Inc., Houston, Tex.

[21] Appl. No.: 09/019,567

[22] Filed: Feb. 6, 1998

Related U.S. Application Data

[60] Provisional application No. 60/037,323, Feb. 7, 1997, abandoned, and provisional application No. 60/065,739, Nov. 17, 1997, abandoned.

[51] Int. Cl.⁷ .............................. C08L 23/06; C08L 23/08
[52] U.S. Cl. ...................... 525/240; 525/241; 525/320; 525/70; 526/352
[58] Field of Search ................................ 525/240, 241, 525/320, 70; 526/352

[56] References Cited

U.S. PATENT DOCUMENTS

| | | |
|---|---|---|
| 5,026,798 | 6/1991 | Canich . |
| 5,206,303 | 4/1993 | Tse et al. . |
| 5,272,236 | 12/1993 | Lai et al. . |
| 5,278,272 | 1/1994 | Lai et al. . |
| 5,294,678 | 3/1994 | Tse et al. . |
| 5,324,800 | 6/1994 | Welborn et al. . |
| 5,475,075 | 12/1995 | Brant et al. . |

FOREIGN PATENT DOCUMENTS

| | | |
|---|---|---|
| 0 659 773 A1 | 6/1995 | European Pat. Off. . |
| WO 94/07930 | 4/1994 | WIPO . |
| WO 96 39451 | 12/1996 | WIPO . |

*Primary Examiner*—David W. Wu
*Assistant Examiner*—Caixia Lu
*Attorney, Agent, or Firm*—William G. Muller; Frank E. Reid

[57] ABSTRACT

The invention is a polyethylene composition having a polydispersity index of less than or equal to 3, an average branching index (g') as measured by GPC/Vis≧0.9, and a melt strength (MS) (centiNewton, 190° C.) that satisfies the relationship:

$$MS \geq \frac{3.0}{\text{Melt Index (2.16 kg/190° C.)}} + 4.5.$$

In a preferred embodiment these polyethylene compositions comprise A) branched polyethylene copolymers prepared by insertion polymerization of ethylene, ethylene-containing macromers, and optionally, additional copolymerizable monomers, and B) essentially linear ethylene copolymers. Improved melt strength without sacrificing the benefits of narrow polydispersity index are exhibited by the invention compositions.

9 Claims, 1 Drawing Sheet

HIGH MELT STRENGTH POLYETHYLENE COMPOSITIONS

This application is based on Provisional Application U.S. Ser. No. 60/037,323 filed Feb. 7, 1997 now abandoned and related to provisional application U.S. Ser. No. 60/065,739 filed Nov. 17, 1997 now abandoned.

TECHNICAL FIELD

The invention relates to polyethylene blend compositions comprising branched ethylene copolymers incorporated for improved physical properties.

BACKGROUND ART

Ethylene copolymers are a well-known class of olefin copolymers from which various plastic products are produced. Such products include films, fibers, coatings and then no molded articles such as containers and consumer goods. The polymers used to prepare these articles are prepared from ethylene, optionally with one or more additional copolymerizable monomers. Low density polyethylene ("LDPE") as produced by free radical polymerization consists of highly branched polymers where the branches occur randomly throughout the polymer, that is on any number of formed segments or branches. This structure exhibits easy processing, that is polymers with it can be melt processed in high volumes at low energy input. Machinery for conducting this melt processing, for example extruders and film dies of various configurations, was designed into product finishing manufacturing processes with optimal design features based on the processing characteristics of the LDPE.

However, with the advent of effective coordination catalysis of ethylene copolymers, the degree of branching was significantly decreased, both for the now traditional Ziegler-Natta ethylene copolymers and the newer metallocene catalyzed ethylene copolymers. Both, particularly the metallocene copolymers, are essentially linear polymers, which are more difficult to melt process when the molecular weight distribution ($PDI=M_w/M_n$, where $M_w$ is weight-average molecular weight and $M_n$ is number-average molecular weight) is narrower than about 3.5. Thus broad PDI copolymers are more easily processed but can lack desirable solid state attributes otherwise available from the metallocene copolymers. Thus it has become desirable to develop effective and efficient methods of improving the melt processing of olefin copolymers while retaining desirable melt properties and end use characteristics.

The introduction of long chain branches into substantially linear olefin copolymers has been observed to improve processing characteristics of the polymers. Such has been done using metallocene-catalyzed polymers where significant numbers of olefinically unsaturated chain ends are produced during the polymerization reaction. See, e.g., U.S. Pat. No. 5,324,800. The olefinically unsaturated polymer chains can become "macromonomers" or "macromers" and, apparently, can be re-inserted with other copolymerizable monomers to form the branched copolymers. International publication WO 94/07930 addresses advantages of including long chain branches in polyethylene from incorporating vinyl-terminated macromers into polyethylene chains where the macromers have critical molecular weights greater than 3,800, or, in other words contain 250 or more carbon atoms. This document describes a large class of both monocyclopentadienyl and biscyclopentadienyl metallocenes as suitable in accordance with the invention when activated by either alumoxanes or ionizing compounds providing stabilizing, noncoordinating anions.

U.S. Pat. Nos. 5,272,236 and 5,278,272 describe "substantially linear" ethylene polymers which are said to have up to about 3 long chain branches per 1000 carbon atoms. These polymers are described as being prepared with monocyclopentadienyl transition metal olefin polymerization catalysts, such as those described in U.S. Pat. No. 5,026,798. The copolymer is said to be useful for a variety of fabricated articles and as a component in blends with other polymers. EP-A-0 659 773 A1 describes a gas phase process using metallocene catalysts said to be suitable for producing polyethylene with up to 3 long chain branches per 1000 carbon atoms in the main chain, the branches having greater than 18 carbon atoms.

Reduced melt viscosity polymers are addressed in U.S. Pat. Nos. 5,206,303 and 5,294,678. "Brush" polymer architecture is described where the branched copolymers have side chains that are of molecular weights that inhibit entanglement of the backbone chain. These branch weight-average molecular weights are described to be from $0.02-2.0$ $M_e^B$, where $M_e^B$ is the entanglement molecular weight of the side branches. Though the polymers illustrated are isobutylene-styrene copolymers, calculated entanglement molecular weights for ethylene polymers and ethylene-propylene copolymers of 1,250 and 1,660 are provided. Comb-like polymers of ethylene and longer alpha-olefins, having from 10 to 100 carbon atoms, are described in U.S. Pat. No. 5,475,075. The polymers are prepared by copolymerizing ethylene and the longer alpha-olefins which form the side branches. Improvements in end-use properties, such as for films and adhesive compositions are taught.

A limitation with the polyethylene compositions of the prior art is that though the processability, ease of melt processing or increase in shear-thinning properties, can be improved with the introduction of branching in the polymers, the molecular weight distribution as measured by the polydispersity index (PDI) tends to increase with increased branching even though the melt strength remains well below that exhibited by traditional LDPE. Typically the improved processing was achieved by blending different molecular weight polyethylene copolymer components or introducing various levels of branching into polyethylene copolymers. Accordingly, it has been generally thought that the advantages of the narrow PDI made possible by metallocene catalysis needed to be sacrificed, at least in part, if improved melt strength polyethylene copolymer compositions were sought.

SUMMARY OF THE INVENTION

The invention is a polyethylene composition having a polydispersity index of less than or equal to 3, an average branching index (g') as measured by GPC/Vis$\geq$0.9, and a melt strength (MS) (centiNewton, 190° C.) that satisfies the relationship:

$$MS \geq \frac{3.0}{\text{Melt Index (2.16 kg/190° C.)}} + 4.5.$$

In a preferred embodiment these polyethylene compositions comprise A) branched polyethylene copolymers prepared by insertion polymerization of ethylene, ethylene-containing macromers, and optionally, additional copolymerizable monomers, and B) essentially linear ethylene copolymers having density of 0.900–0.935 g/cm$^3$, CDBI of 50–95%, PDI of 1.8–3.5 and an Melt Index (2.16 kg/190° C.) of 0.3–7.5. Improved melt strength without sacrificing the benefits of narrow polydispersity index are exhibited by the invention compositions. A preferred polyethylene composition according to the invention comprises 30 to 0.9 wt % of the A) branched polyethylene copolymers and 70 to 99.1 wt % of the B) essentially linear ethylene copolymers.

DETAILED DESCRIPTION OF THE INVENTION

Figure 1:
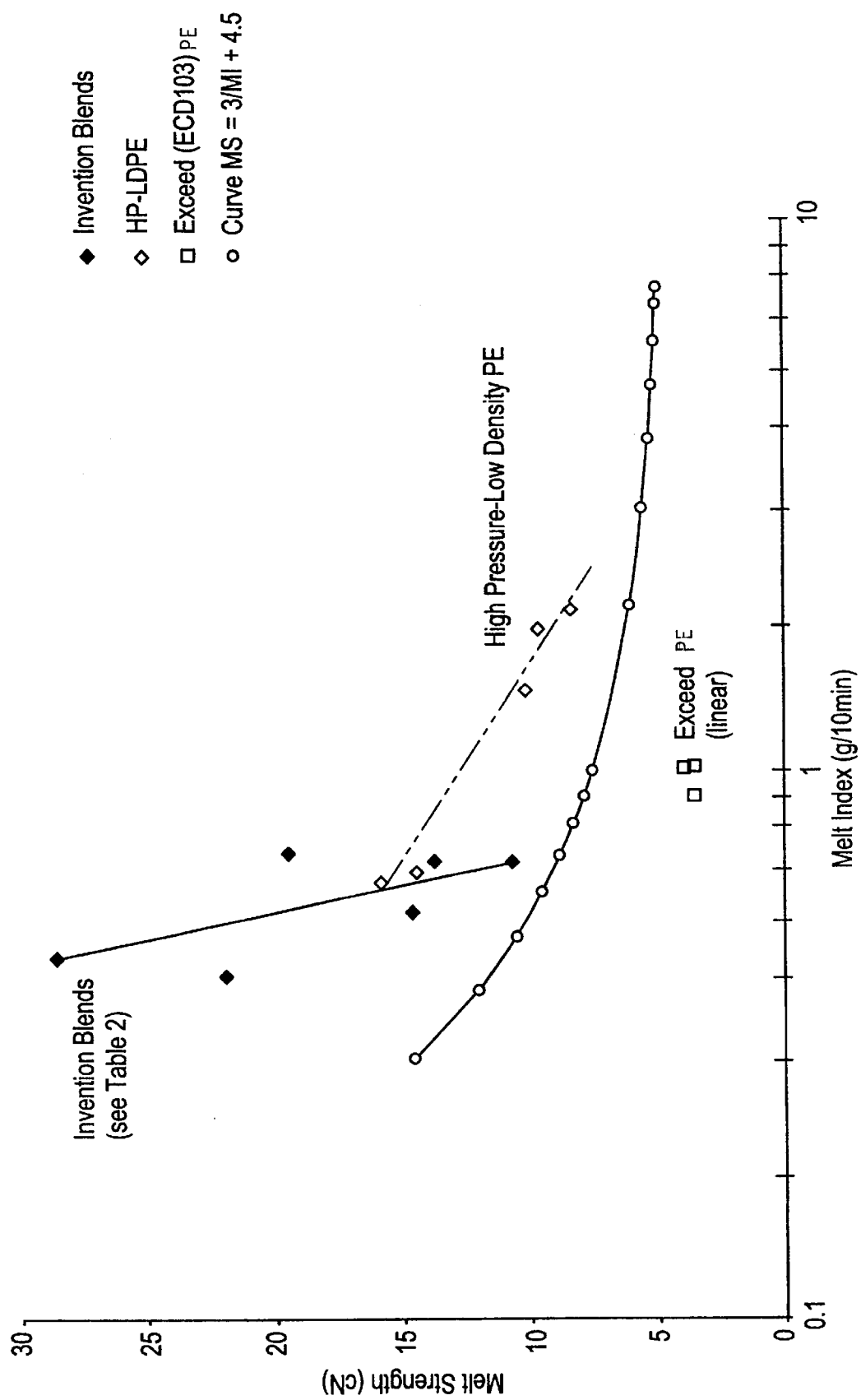
FIG. 1 illustrates the melt strength (cN) values plotted against melt index (g/10 m; 190/2.1) for blend compositions according to the invention, linear metallocene copolymers and traditional low density polyethylene (LDPE) prepared by high pressure, free radical polymerization.

The polyethylene compositions of this invention comprise branched polyethylene copolymers wherein both the copolymer backbone and polymeric sidechains are derived from monoolefins polymerized under coordination or insertion conditions with activated transition metal organometallic catalyst compounds.

The polymeric sidechains comprise ethylene, either alone or with other insertion polymerizable monomers. Known monomers meeting this criteria are the $C_3$–$C_{20}$ α-olefins, $C_5$–$C_{25}$ cyclic olefins, $C_5$–$C_{25}$ styrenic olefins, lower carbon number ($C_3$–$C_8$) alkyl-substituted analogs of the cyclic and styrenic olefins, and $C_3$–$C_{15}$ geminally disubstituted olefins, e.g., isobutylene. Ethylene homopolymer or copolymer sidechains are both suitable. Thus, typically, the sidechains can comprise from 85–100 mol % ethylene, and from 0–15 mol % comonomer, preferably 90–99 mol % ethylene and 1–10 mol % comonomer, most preferably 94–98 mol % ethylene and 2–6 mol % comonomer. The selection of comonomer can vary, for instance, a longer olefin comonomer, such as 1-octene, may be preferred over a shorter olefin such as 1-butene for improved polyethylene film tear.

The sidechains can have narrow or broad molecular weight distribution (MWD=PDI=$M_w/M_n$), for example, from 1.1 to 30, typically 2–8. Additionally, the sidechains can have different comonomer compositions, e.g., including the orthogonal compositional distributions described in U.S. Pat. No. 5,382,630 (CDBI >50%), incorporated by reference for purposes of U.S. patent practice. Optionally, mixtures of sidechains with different molecular weights and/or compositions may be used.

The $M_n$ of the sidechains are within the range of from greater than or equal to 1500 and less than or equal to 45,000. Preferably the $M_n$ of the sidechains is from 1500 to 30,000, and more preferably the $M_n$ is from 1500 to 25,000. The number of sidechains is related to the $M_n$ of the sidechains such that the total weight ratio of the weight of the sidechains to the total weight of the polymeric backbone segments between and outside the incorporated sidechains is less than 30%, preferably 4–20%. Weight here is determined by gel permeation chromatography (GPC) and differential refractive index (DRI) measurements.

The backbone, or backbone polymeric segments, are typically of an ethylene-containing polymeric structure, either homopolymer or copolymer. Other copolymerizable monomers may selected from those suitable for the branches, above, and include α-olefins, geminally disubstituted olefins such as isobutylene, cyclic olefins such as cyclopentene, norbomene and alkyl-substituted norbornenes, and styrenic monomers such as styrene and alkyl substituted styrenes. The macromer and backbone may be of the same composition or may be constituted of differing monomer selection. The branches and the backbone may independently exhibit ethylene crystallinity or may be essentially amorphous. Since the branched copolymer, comprising the ethylene-containing branches and backbone, are prepared by the copolymerization of ethylene, terminally unsaturated macromers, and optionally other copolymerizable monomers, the term copolymer here means derived by insertion polymerization from ethylene and one or more ethylenically unsaturated monomer such as listed above.

As indicated above the mass of the backbone will typically comprise at least 40 wt % of the total polymer mass, that of the backbone and the sidechains together. The backbone typically will have a nominal weight-average molecular weight ($M_w$) weight of at least equal to or greater than about 50,000. The term nominal is used to indicate that direct measurement of $M_w$ of the backbone is largely impossible but that characterization of the copolymer product will exhibit measurements of $M_w$ that correlate to a close approximate weight of the polymeric backbone inclusive only of the monoolefin mer derivatives and the insertion moieties of the sidebranches.

The branched ethylene copolymers comprising the above sidechains and backbones will typically have an $M_w$ greater than 50,000 as measured by GPC/DRI as defined for the examples. The $M_w$ typically can exceed 200,000, preferably 300,000, up to 500,000 or higher.

The branched ethylene copolymers of the invention can be prepared by a process comprising: A) copolymerizing ethylene, preferably with one or more copolymerizable monomers, in a polymerization reaction under conditions sufficient to form a copolymer having greater than 40% chain end-group unsaturation, preferably greater than 60%, and most preferably the unsaturation being vinyl groups; B) copolymerizing the product of A) with ethylene and one or more copolymerizable monomers so as to prepare the branched ethylene copolymer. The process step A) can be usefully practiced in a solution process in which said ethylene and, optionally, one or more copolymerizable monomers, is contacted with a transition metal olefin polymerization catalyst activated by an alkylalumoxane cocatalyst, the mole ratio of aluminum to transition metal being less than about 220:1. The terminally unsaturated copolymer population so formed, with or without separation from copolymer product having only saturated ends, can then be copolymerized with ethylene and copolymerizable monomers in a separate reaction by solution, slurry or gas phase ethylene polymerization with an activated transition metal insertion polymerization catalyst, particularly a catalyst capable of incorporating the unsaturation-containing ethylene copolymers into said branched olefin copolymer.

Conditions sufficient to form the sidechain copolymer include using suitable ethylene and comonomer reactant ratios to assure the described sidechain olefin-derived unit constitution, plus catalyst and process conditions conducive to forming the unsaturated chain ends. The teachings of copending provisional application U.S. Ser. No. 60/037,323 filed Feb. 7, 1997 are specific to suitable catalyst selection and use to prepare macromeric copolymer chains with a high yield of vinyl unsaturation. The metallocene catalyst used in the step A) preparation of the unsaturation-containing macromer can be essentially any catalyst capable of insertion polymerization of ethylene, it can be one capable of high comonomer incorporation capability (see below) or of low comonomer incorporation capability. Those of low incorporation capability are typically those that are more sterically congested at the metal coordination site, thus unbridged and substituted unbridged metallocene catalysts are particularly suitable. See also the teachings of U.S. Pat. No. 5,498,809 and international publications WO 94/19436 and WO 94/13715, describing means of preparing vinylidene-terminated ethylene-1-butene copolymers in high yields. See also, the teachings of copending application U.S. Ser. No. 08/651,030, filed May 21, 1996, U.S. Pat. No. 5,763,556 as to the preparation of ethylene-isobutylene copolymers having high levels of vinylidene chain-end unsaturation. Throughout the description above, and below, the phrase "chain-end" or "terminal" when referring to unsaturation means olefin unsaturation suitable for insertion polymerization whether or not located precisely at the terminus of a chain. All documents of this paragraph are incorporated by reference for purposes of U.S. patent practice.

In a preferred embodiment, polymeric vinyl-containing macromer product suitable as branches for a subsequent copolymerization reaction can be prepared under solution polymerization conditions with preferred molar ratios of aluminum in the alkyl alumoxane activator, e.g., methyl alumoxane (MAO), to transition metal. Preferably that level is $\geq 20$ and $\leq 175$; more preferably $\geq 20$ and $\leq 140$; and, most preferably $\geq 20$ and $\leq 100$. The temperature, pressure and time of reaction depend upon the selected process but are generally within the normal ranges for a solution process. Thus temperatures can range from 20° C. to 200° C., preferably from 30° C. to 150° C., more preferably from 50° C. to 140° C., and most preferably between 55° C. and 135° C. The pressures of the reaction generally can vary from atmospheric to 345 MPa, preferably to 182 MPa. For typical solution reactions, temperatures will typically range from ambient to 250° C. with pressures from ambient to 3.45 MPa. The reactions can be run batchwise. Conditions for suitable slurry-type reactions are similar to solution conditions except reaction temperatures are limited to those below the melt temperature of the polymer. In an additional, alternative reaction configuration, a supercritical fluid medium can be used with temperatures up to 250° C. and pressures up to 345 MPa.

Macromer incorporation for branched polymer preparation can be accomplished by adding the macromer product into an insertion polymerization environment with a catalyst compound capable of bulky monomer incorporation. Suitable catalyst compounds are those that are capable of good comonomer incorporation without significant depression in $M_n$ for the polymeric backbone under the temperature and pressure conditions used. The teachings of copending provisional applications U.S. Ser. No. 60/037,323, above, and application U.S. Ser. No. 60/046,812, filed May 2, 1997, are specific to suitable catalyst selection and use to prepare branched olefin copolymers and addresses catalyst compounds suitable for high comonomer and macromonomer incorporation. As indicated therein, preferred catalyst compounds for assembling the branch olefin copolymers from vinyl- or vinylidene containing macromers, ethylene and copolymerizable comonomers include the bridged biscyclopentadienyl and monocyclopentadienyl Group 4 metal compounds of U.S. Pat. Nos. 5,198,401, 5,270,393, 5,324,801, 5,444,145, 5,475,075, 5,635,573, and International applications WO92/00333 and WO96/00244. Also, WO94/07930 describes terminally unsaturated macromer preparation and incorporation of those macromers in branched polyolefins. In accordance with these teachings, the transition metal catalyst compounds are typically used with activating co-catalyst components as described, e.g., alkyl alumoxanes and ionizing compounds capable of providing stabilizing noncoordinating anions. The teachings of each of the documents of this paragraph are also incorporated by reference for purposes of U.S. patent practice. The resulting copolymer product will contain the branched copolymer of the invention, essentially linear backbone copolymer, without significant branching, and residual unreacted macromer. The linear copolymer and residual macromer are generally of small amounts, which can lead to a minor amount of cross-linking. But this is of such a minor effect that it does not substantially alter the overall properties of the final blend composition. Polymer fractionation could be effected to separate the majority branched copolymer fraction from the others, but generally will not be necessary for most applications.

Industrial Applicability

The polyethylene compositions according to the invention will have use in a variety of applications for which polyethylene homopolymer and copolymer compositions are known to be useful. Such include a variety of uses such as film compositions, and molded or extruded articles. Useful blends preferably contain at least 0.5 wt % branched copolymer, preferably 20 wt % or greater, and preferably not more than about 20 wt %, more preferably 10 wt % or less, with the majority component comprising essentially linear chains.

EXAMPLES

In order to illustrate the present invention, the following examples are provided. Such are not meant to limit the invention in any respect, but are solely provided for illustration purposes.

Branched copolymers were synthesized in ethylene/hexene/macromer (E/H/M) termpolymerizations in which the macromer content was varied systematically. The vinyl-terminated macromer for these reactions was synthesized as per U.S. Ser. No. 60/037,323, above. The products of the terpolymerizations were blended with a commercial, metallocene-derived linear polyethylene (linear PE) at 3.5 weight percent and 7 weight percent loadings.

General:

All polymerizations were performed in a Zipperclave reactor equipped with a water jacket for temperature control. The reactor was first cleaned by heating to 150° C. in toluene to dissolve any polymer residues, then cooled and drained. Next, the reactor was heated using jacket water at 120° C. and the reactor was purged with flowing nitrogen for a period of ~30 minutes. Before reaction, the reactor was further purged using 10 nitrogen pressurize/vent cycles (to 100 psi) and 2 ethylene pressurize/vent cycles (to 300 psi). The cycling served three purposes: (1) to thoroughly penetrate all dead ends such as pressure gauges to purge fugitive contaminants, (2) to displace nitrogen in the system with ethylene, and (3) to pressure test the reactor.

Liquids were measured into the reactor using calibrated sight glasses. High purity (>99.5%) hexane, toluene and butene feeds were purified by passing first through basic alumina activated at high temperature in nitrogen, followed by 5A molecular sieve activated at high temperature in nitrogen. Polymerization grade ethylene was supplied directly in a nitrogen-jacketed line and used without further purification. Clear, 10% methylalumoxane (MAO) in toluene was received from Albemarle Inc. in stainless steel cylinders, divided into 1-liter glass containers, and stored in a laboratory glove-box at ambient temperature. Ethylene was added to the reactor as needed to maintain total system pressure at the reported levels (semi-batch operation). Ethylene flow rate was monitored using a Matheson mass flow meter (model number 8272-0424). To ensure the reaction medium was well-mixed, a flat-paddle stirrer rotating at >1000 rpm was used.

All catalyst preparations were performed in an inert atmosphere with <1.5 ppm $H_2O$ content. In order to accurately measure small amounts of catalyst, freshly prepared catalyst stock solution/dilution methods were used in catalyst preparation. To maximize solubility of the metallocenes, toluene was used as a solvent. Stainless steel transfer tubes were washed with MAO to remove impurities, drained, and activator and catalyst were added by pipette.

Macromer Preparation:

A stainless steel catalyst addition tube was prepared as outlined above. An aliquot of 2.0 milliliters of 10% methylalumoxane (MAO) solution in toluene was added, followed by 32 milliliters of a toluene solution containing 1 milligram of $Cp_2ZrCl_2$ (biscyclopentadienyl zirconium dichloride) per milliliter. The sealed tube was removed from the glovebox and connected to a 2-liter Zipperclave reactor port under a continuous flow of nitrogen. A flexible, stainless steel line from the reactor supply manifold was connected to the other end of the addition tube under a continuous flow of nitrogen. The reactor was purged and pressure tested as outlined above. Then, 1200 ml of toluene was charged to the reactor and heated to 120° C. The temperature was allowed to equilibrate, and the base system pressure was recorded. The desired partial pressure of ethylene (40 psig/0.276 mPa) was added on top of the base system pressure. After allowing the ethylene to saturate the system (as indicated by zero ethylene flow), the catalyst was injected in a pulse using high pressure solvent. Reaction progression was monitored by reading ethylene uptake from the electronic mass flow meter. The reaction was terminated by rapid cooling (~1 minute) and addition of an excess of methanol to precipitate the polymer product. The polymer/solvent mixture was dried in flowing nitrogen to yield a solid homopolyethylene macromer-containing product. The product of 15 independent, consecutive runs were each measured for $M_n$ and $M_w$ by GPC/DRI. The $M_n$ values ranged from 3,700 to 4,605 and $M_w$ from 9,064 to 11,603. Vinyl unsaturation levels were from 70.9 to 76.3% based upon total unsaturation levels. The macromer product of each run was dry blended together prior to use in the next step.

Branched Ethylene Copolymer Preparation:

The solid macromer product was added to the open Zipperclave reactor, which was then closed and for a period of 30 minutes, purged with flowing dry nitrogen at 60° C. An aliquot of 2 milliliter of 10% methylalumoxane (MAO) solution in toluene was added to a clean stainless steel addition tube, followed by addition of a solution containing 32 mg of $(C_5Me_4SiMe_2NC_{12}H_{23})TiCl_2$ (tetramethylcyclopentadienyl-dimethylsilyl-dodecylamido-zirconiumdichloride) in 10 ml. toluene. The sealed tube was removed from the glovebox and connected to a 1-liter Zipperclave reactor port. A flexible, stainless steel line from the reactor supply manifold was connected to the other end of the addition tube under a continuous flow of nitrogen. Five hundred (500 ml) milliliters of toluene were added to the reactor after the purge period and the system was heated to 100° C. under a blanket of nitrogen of 100 psi (0.689 mPa). After 15 minutes of heating and stirring under nitrogen, hexene (5 ml) was added to the macromer solution. The catalyst solution was then added to the reactor with a partial pressure of ethylene of 60 to 65 psi (0.413 to 0.448 mPa) being applied directly. The polymerization was carried out at a temperature of 90° C. for 10 minutes. All polymer retrieved from the reactor was allowed to dry at room temperature under blowing nitrogen. Three different levels of macromer product amounts were tested in these polymerizations: 2.5 grams, 5 grams, and 10 grams. See Table 1 below.

TABLE 1

Branched Ethylene Copolymer Preparation

| Run | Hexene (ml) | Macromer (g) | Ethylene Partial Pressure (psi/kPa) | Temp. (° C.) | Rxn Time (min) |
|---|---|---|---|---|---|
| I | 5 | 2.5 | 65/.448 | 120 | 10 |
| II | 5 | 5.0 | 65/.448 | 120 | 10 |
| III | 5 | 10 | 65/.448 | 120 | 10 |

The branched ethylene polymers thus synthesized had the three systematically varied macromer or branch contents illustrated. These products were blended by melt-processing with a commercial, metallocene-derived linear PE, 0.9 MI, and density 0.918, at 3.5 weight percent and 7 weight percent loadings. Blending was conducted in a nitrogen-purged Banbury mixer, the blending temperature was 177 to 204° C. See Table 2.

TABLE 2

Polyethylene Blend Compositions

| Blend | Terpolymer (g)/ (Run) | Linear PE* (g) | MI | MIR | MS (cN) | $M_w$ | $M_n$ | PDI |
|---|---|---|---|---|---|---|---|---|
| A | 50/I | 1250 | 0.68 | 20.8 | 10.7 | 119917 | 53643 | 2.24 |
| B | 100/I | 1200 | 0.55 | 22.0 | 14.6 | 131695 | 50909 | 2.59 |
| C | 50/II | 1250 | 0.68 | 18.8 | 13.7 | 127277 | 52445 | 2.43 |
| D | 100/II | 1200 | 0.42 | 24.0 | 21.9 | 132204 | 491366 | 2.69 |
| E | 50/III | 1250 | 0.70 | 18.6 | 19.5 | 125541 | 52260 | 2.40 |
| F | 100/III | 1200 | 0.45 | 23.8 | 28.5 | 129012 | 44301 | 2.91 |

*ECD ® 103 (Exxon Chemical Co.), ethylene-hexene LLDPE copolymer having MI of 0.9 and density 0.918, with 0.1 wt % Irganox ® and 0.1 wt % Irgaphos ® (Ciba-Geigy Co.) stabilizers.

Product Characterization:

The melt index (MI) was measured in accordance with ASTM D 1238 (190° C., 2.1 kg), the melt index ratio (MIR) was determined from the ratio of the MI measurements at (190° C., 21.0 kg) to that at (190° C., 2.1 kg). The blend product samples were analyzed for $M_w$, $M_n$, and PDI ($M_w/M_n$) by gel permeation chromatography (GPC) using a Waters 150° C. high temperature system equipped with a DRI Detector, Shodex AT-806MS column and operating at a system temperature of 145° C. The solvent used was 1,2,4 trichlorobenzene, from which polymer sample solutions of 0.1 mg/ml concentration were prepared for injection. The total solvent flow rate was 1.0 ml/minute and the injection size was 300 microliters. GPC columns were calibrated using a series of narrow polystyrenes (obtained from Tosoh Corporation, Tokyo, 1989). For quality control, a broad-standard calibration based on the linear PE sample NBS-1475 was used. The standard was run with each 16-vial carousel. It was injected twice as the first sample of each batch. After elution of the polymer samples, the resulting chromatograms were analyzed using the Waters Expert Fuse program to calculate the molecular weight distribution and $M_n$ and $M_w$ averages.

Another characteristic of the polymer of the invention is its composition distribution (CD). A measure of composition distribution is the "Composition Distribution Breadth Index" (CDBI). CDBI is defamed as the weight percent of the copolymer molecules having a comonomer content within 50% (that is, 25% on each side) of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, vol. 20, p. 441 (1982) and U.S. Pat. No. 5,008,204, which are both incorporated herein by reference.

Melt strength (MS) was measured using a Goettfert Rheotens attached to an Instron capillary rheometer. The polymer melt is extruded through a capillary with a radius of 0.007633 cm and an aspect ratio (capillary length/capillary radius) of 33.531 at a constant plunger velocity. Therefore, the polymer melt is subjected to a constant apparent wall shear rate. The extruded melt is subsequently stretched by a pair of serrated wheels having radii of 1.91 cm at a distance (H) from the capillary exit. The rotational speed of the wheels is increased linearly with time while the draw down force (F) is monitored. Melt strength is reported as the draw down force (cN) when the strand breaks. The following conditions were used in the melt strength measurements.

Temperature=190° C.

Plunger speed=0.127 cm/s wheel acceleration=2.4 cm/s/s capillary radius=0.076327 cm capillary length=2.5593 cm barrel radius=0.47625 cm wheel radius=1.91 cm In the attached FIG. 1, the exemplary blend compositions A through F are plotted by MS vs. MI. For comparison purposes a series of low density polyethylene grades (LDPE) sold as ESCORENE® branded grades by Exxon Chemical Co., and measurements of EXCEED® ECD-103, also from EXXON CHEMICAL CO., are similarly illustrated. See Table 3 below for the LDPE grade identification.

TABLE 3

LDPE Compositions

| Grade Name | MI (190/2.1) | MS(cN) |
|---|---|---|
| LD 134 | 1.95 | 8.3 |
| LD 134.09 | 1.8 | 9.6 |
| LD 117 | 1.4 | 10.1 |
| LD 140.09 | 0.65 | 14.4 |
| LD 140.09 | 0.62 | 15.8 |

The figure graphically illustrates that the melt strength of the invention blends can significantly exceed the values typical of traditional highly branched LDPE while retaining the narrow PDI and MIR characteristics of linear ethylene homopolymers or copolymers from single-sited catalysts such as metallocenes.

We claim:

1. A polyethylene composition having a polydispersity index of less than or equal to 3, an average branching index (g') as measured by gel permeation chromotography/viscosity (GPC/Vis)≧0.9, and a melt strength (MS) (centiNewton, 190° C.) that satisfies the relationship:

$$MS \geq \frac{3.0}{\text{Melt Index (2.16 kg/190° C.)}} + 4.5$$

wherein said composition comprises a branched polyethylene copolymer prepared by insertion polymerization of ethylene, ethylene-containing macromers, and optionally, additional copolymerizable monomers, and an essentially linear ethylene copolymer having density of 0.900–0.935 g/cm$^3$, polydispersity index of 1.8–3.5 and a melt index (2.16 kg/190° C.) of 0.3–7.5.

2. The polyethylene composition according to claim 1 wherein said essentially linear ethylene copolymer comprises from 70 to 99.1 wt % of said composition.

3. The polyethylene composition according to claim 1 wherein said branched ethylene copolymer comprises from 30 to 0.9 wt % of said composition.

4. The polyethylene composition according to claim 3 wherein said ethylene-containing macromers consist essentially of units derived by insertion copolymerization of ethylene.

5. The polyethylene composition according to claim 3 wherein said ethylene-containing macromers comprise units derived by insertion copolymerization of ethylene and at least one member selected from the group consisting of $C_3$–$C_{20}$ α-olefins, $C_5$–$C_{25}$ cyclic and substituted cyclic olefins, $C_5$–$C_{25}$ styrenic and substituted styrenic olefins.

6. The polyethylene composition according to claim 4 wherein said ethylene-containing macromers comprise units derived by insertion copolymerization of ethylene and at least one member selected from the group consisting of butene, 1-hexene and 1-octene.

7. The polyethylene composition according to claim 2 wherein said essentially linear ethylene copolymers comprise units derived by insertion polymerization of ethylene and one or more members selected from the group consisting of $C_3$–$C_{20}$ α-olefins, $C_5$–$C_{25}$ cyclic and substituted cyclic olefins, $C_5$–$C_{25}$ styrenic and substituted styrenic olefins.

8. The polyethylene composition according to claim 6 wherein said essentially linear ethylene copolymers comprise units derived by insertion copolymerization of ethylene and at least one member selected from the group consisting of butene, 1-hexene and 1-octene.

9. The polyethylene composition according to claim 1 wherein said composition comprises from 10 to 0.9 wt % of said branched polyethylene copolymer and from 90 to 99.1 wt % of said linear ethylene copolymer.

* * * * *